US005206307A

United States Patent [19]
Chamberlain et al.

[11] Patent Number: 5,206,307
[45] Date of Patent: * Apr. 27, 1993

[54] PROCESS FOR SELECTIVE HYDROGENATION OF CONJUGATED DIOLEFIN POLYMERS

[75] Inventors: Linda Rae Chamberlain, Richmond; Carma J. Gibler, Houston, Tex.

[73] Assignee: Shell Oil Company, Houston, Tex.

[ * ] Notice: The portion of the term of this patent subsequent to Jul. 21, 2009 has been disclaimed.

[21] Appl. No.: 907,349

[22] Filed: Jul. 1, 1992

Related U.S. Application Data

[63] Continuation-in-part of Ser. No. 756,392, Sep. 9, 1991, Pat. No. 5,132,372.

[51] Int. Cl.$^5$ ................................................ C08F 8/04
[52] U.S. Cl. .................................. 525/338; 525/332.8; 525/332.9; 525/333.1; 525/333.2; 525/339
[58] Field of Search .............................. 525/338, 339

[56] References Cited

U.S. PATENT DOCUMENTS

| | | |
|---|---|---|
| 2,449,949 | 9/1944 | Morris et al. . |
| 3,113,986 | 12/1963 | Breslow et al. . |
| 3,472,829 | 10/1969 | Claybaugh et al. . |
| 3,475,399 | 10/1969 | Peters et al. . |
| 3,525,729 | 8/1970 | Gaeth . |
| 3,541,064 | 11/1970 | Yoshimoto et al. . |
| 3,580,897 | 5/1971 | Yoshimoto et al. . |
| 3,720,654 | 3/1973 | Olechowski . |
| 3,937,759 | 2/1976 | Baumgartner et al. . |
| 4,014,859 | 3/1977 | Cooper et al. . |
| 4,156,673 | 5/1979 | Eckert . |
| 4,340,703 | 7/1982 | Freppel . |
| 4,501,847 | 2/1985 | Kishimoto et al. . |
| 4,547,555 | 10/1985 | Cook et al. . |
| 4,629,767 | 12/1986 | Shyr et al. . |
| 4,673,714 | 6/1987 | Kishimoto et al. . |
| 4,980,421 | 12/1990 | Teramoto et al. . |
| 5,039,755 | 8/1991 | Chamberlain et al. . |

FOREIGN PATENT DOCUMENTS

| | | |
|---|---|---|
| 0339986 | 11/1989 | European Pat. Off. . |
| 62-209103 | 9/1987 | Japan . |
| 363810 | 12/1931 | United Kingdom . |

OTHER PUBLICATIONS

Ziegler–Natta Catalysts and Polymerizations, John Boor, Jr., published by Academic Press in 1979.
Journal of Organo Metallic Chemistry, Feb. 6, 1990, vol. 382, Nos. 1 and 2, pp. 69–76.

*Primary Examiner*—Bernard Lipman
*Attorney, Agent, or Firm*—Donald F. Haas

[57] ABSTRACT

This is an improved process for the hydrogenation of conjugated diolefin polymers which comprises polymerizing or copolymerizing at least one conjugated diolefin with an organo alkali metal polymerization initiator in a suitable solvent thereby creating a living polymer, terminating the polymerization by the addition of hydrogen and effecting selective hydrogenation of the unsaturated double bonds in the conjugated diolefin units of the terminated polymer by contacting the polymer, in the absence of hydrocarbon lithium and alkoxy lithium compounds, with hydrogen in the presence of at least one bis(cyclopentadienyl)titanium compound. The improvement is the use of an alkyl benzoate as a promoter in the hydrogenation step.

20 Claims, 1 Drawing Sheet

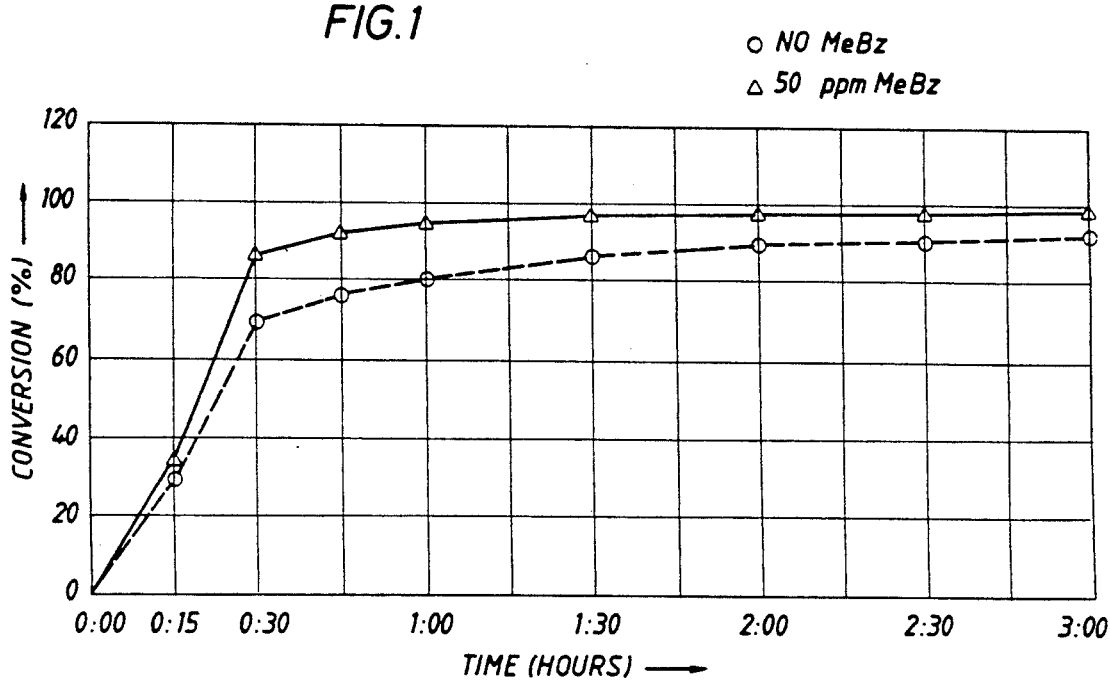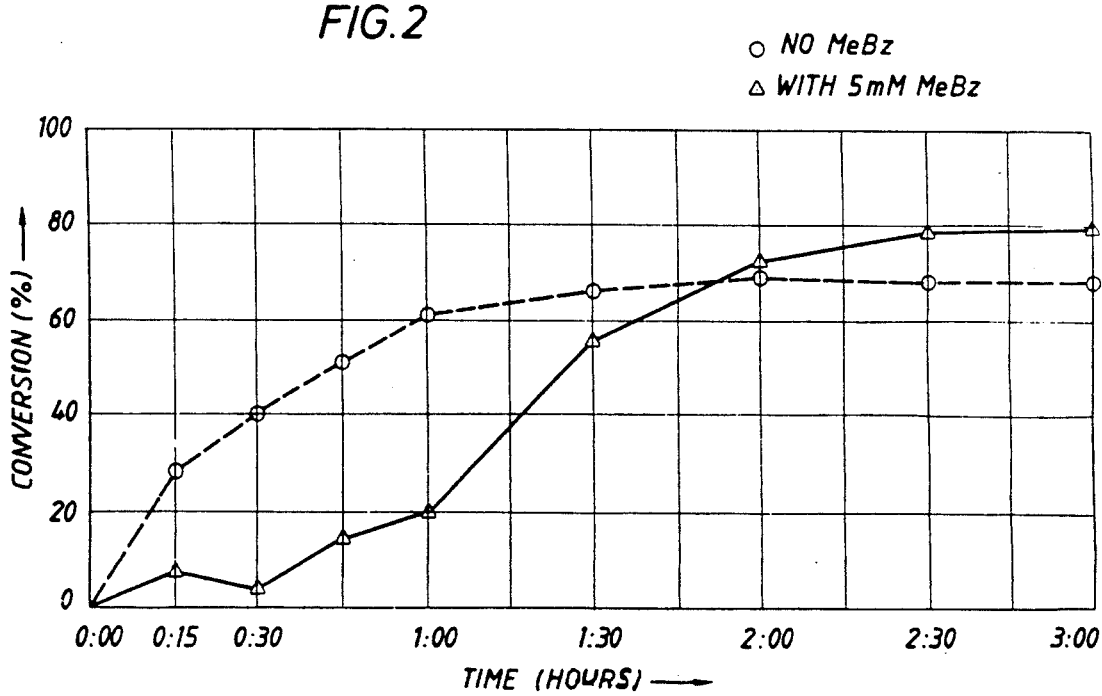

PROCESS FOR SELECTIVE HYDROGENATION OF CONJUGATED DIOLEFIN POLYMERS

REFERENCE TO PRIOR APPLICATION

This application is a continuation-in-part of Ser. No. 756,392 filed Sep. 9, 1991, which is now Pat. No. 5,132,372.

BACKGROUND OF THE INVENTION

The present invention relates to an improved process for the production of selectively hydrogenated polymers of conjugated dienes utilizing a titanium hydrogenation catalyst and more particularly to the use of a new hydrogenation catalyst promoter.

The hydrogenation or selective hydrogenation of conjugated diene polymers has been accomplished using any of the several hydrogenation processes known in the prior art. For example the hydrogenation has been accomplished using methods such as those taught, for example, in U.S. Pat. Nos. 3,494,942; 3,634,594; 3,670,054; 3,700,633 and Re. 27,145, the disclosure of which patents are incorporated herein by reference. These methods known in the prior art for hydrogenating polymers containing ethylenic unsaturation and for hydrogenating or selectively hydrogenating polymers containing aromatic and ethylenic unsaturation, involve the use of a suitable catalyst, particularly a catalyst or catalyst precursor comprising a Group VIII metal.

In the methods described in the foregoing patents, a catalyst is prepared by combining a Group VIII metal, particularly nickel or cobalt, compound with a suitable reducing agent such as an aluminum alkyl. Also, while aluminum alkyls are the preferred reducing agents, it is known in the prior art that alkyls and hydrides of metals of Groups I-A, II-A and III-B of the Periodic Table of the Elements are effective reducing agents, particularly lithium, magnesium and aluminum. In general, the Group VIII metal compound is combined with Group I-A, II-A or III-B metal alkyl or hydride at a concentration sufficient to provide Group I-A, II-A and/or III-B metal to Group VIII metal ratios within the range from about 0.1:1 to about 20:1, preferably from about 1:1 to about 10:1. As indicated in the foregoing patents, the hydrogenation catalyst is generally prepared by combining the Group VIII metal compound and the reducing agent in a suitable solvent or diluent at a temperature within the range from about 20° C. to about 60° C. before the catalyst is fed to the hydrogenation reactor.

In 1985, Kishimoto et al. disclosed (in U.S. Pat. No. 4,501,857) that selective hydrogenation of the unsaturated double bonds in conjugated diolefin polymers could be achieved by hydrogenating such polymers in the presence of at least one bis(cyclopentadienyl)-titanium compound and at least one hydrocarbon lithium compound wherein the hydrocarbon lithium compound can be an added compound or a living polymer having a lithium atom in the polymer chain. U.S. Pat. No. 4,980,421 discloses that similar hydrogenation activity can be accomplished with the same titanium compounds in combination with an alkoxy lithium compound which can either be added directly or as a reaction mixture of an organo lithium compound with an alcoholic or phenolic compound. The use of these catalyst systems was said to be advantageous because the catalyst were said to be highly active so that they were effective even in such a small amount as not to affect adversely the stability of a hydrogenated polymer and require no deashing step. Further, the hydrogenation was said to be able to be carried out under mild conditions.

In U.S. Pat. No. 4,673,714, bis(cyclopentadienyl)-titanium compounds were disclosed which preferentially hydrogenate the unsaturated double bonds of conjugated diolefins but do not require the use of an alkyl lithium compound. These titanium compounds were bis(cyclopentiadienyl)titanium diaryl compounds. The elimination of the need for the hydrocarbon lithium compound was said to be a significant advantage of the invention disclosed in the '714 patent.

Copending, commonly assigned U.S. patent application Ser. No. 529,807, filed May 29, 1990, describes a process for the hydrogenation of conjugated diolefin polymers which first involves the polymerization or copolymerization of such monomers with an organo alkali metal polymerization initiator in a suitable solvent thereby creating a living polymer. The living polymer is terminated by the addition of hydrogen. Finally, selective hydrogenation of the unsaturated double bonds in the conjugated diolefin units of the terminated polymer is carried out in the presence of at least one bis(cyclopentadienyl)titanium compound preferably of the formula:

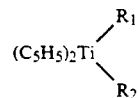

wherein $R_1$ and $R_2$ are the same or different and are selected from the group consisting of halogen groups, $C_1$–$C_8$ alkyl and alkoxy groups, $C_6$–$C_8$ aryloxy groups, aralkyl, cycloalkyl groups, silyl groups and carbonyl groups. The hydrogenation step is carried out in the absence of hydrocarbon lithium and alkoxy lithium compounds.

SUMMARY OF THE INVENTION

The present invention provides an improvement upon the process described in the above copending commonly assigned patent application. The improvement is the utilization in the hydrogenation step of an alkyl benzoate, the alkyl portion preferably containing from 1 to 5 carbon atoms, and especially ethyl benzoate and methyl benzoate as a promoter to enhance the hydrogenation of the polymer. Alkyl benzoates boost the activity of the titanium catalyst and generally result in more extensive saturation of the diene segments of the polymer. The most advantageous range of operation is when the molar ratio of titanium to alkyl benzoate is from about 1:1 to about 6:1.

BRIEF DESCRIPTION OF THE DRAWINGS

FIG. 1 is a plot of the percent conversion versus time of the hydrogenation of a polystyrene-polybutadiene-polystyrene block copolymer of molecular weight 50,000 with and without the addition of methyl benzoate.

FIG. 2 is a plot of the percent conversion versus time of the hydrogenation of a polystyrene-polyisoprene block copolymer of molecular weight 100,000 with and without the addition of methyl benzoate.

DETAILED DESCRIPTION OF THE INVENTION

As is well known, polymers containing both aromatic and ethylenic unsaturation can be prepared by copolymerizing one or more polyolefins, particularly a diolefin, by themselves or with one or more alkenyl aromatic hydrocarbon monomers. The copolymers may, of course, be random, tapered, block or a combination of these, as well as linear, star or radial.

As is well known, polymers containing ethylenic unsaturation or both aromatic and ethylenic unsaturation may be prepared using anionic initiators or polymerization catalyst. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an anionic polymerization initiator such as Group IA metals, their alkyls, amides, silanolates, napthalides, biphenyls and anthracenyl derivatives. It is preferred to use an organoalkali metal (such as sodium or potassium) compound in a suitable solvent at a temperature within the range from about $-150°$ C. to about $300°$ C., preferably at a temperature within the range from about $0°$ C. to about $100°$ C. Particularly effective anionic polymerization initiators are organolithium compounds having the general formula:

$$RLi_n$$

Wherein:
R is an aliphatic, cyloaliphatic, aromatic or alkyl-substituted aromatic hydrocarbon radical having from 1 to about 20 carbon atoms; and n is an integer of 1 to 4.

Conjugated diolefins which ay be polymerized anionically include those conjugated diolefins containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Conjugated diolefins containing from 4 to about 8 carbon atoms are preferred for use in such polymers. Alkenyl aromatic hydrocarbons which may be copolymerized include vinyl aryl compounds such as styrene, various alkyl-substituted styrenes, alkoxy-substituted styrenes, 2-vinyl pyridine, 4-vinyl pyridine, vinyl naphthalene, alkyl-substituted vinyl naphthalenes and the like.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as methyl ether, methyl ethyl ether, diethyl ether, tetrahydrofuran and the like.

Conjugated diolefin polymers and conjugated diolefin-alkyenyl aromatic copolymers which may be used in the present invention include those copolymers described in U.S. Pat. Nos. 3,135,716; 3,150,209; 3,496,154; 3,498,960; 4,145,298 and 4,238,202, the disclosure of which patents are herein incorporated by reference. Conjugated diolefin-alkyenyl aromatic hydrocarbon copolymers which may be used in this invention also include block copolymers such as those described in U.S. Pat. Nos. 3,231,635; 3,265,765 and 3,322,856, the disclosure of which patents are also incorporated herein by reference. In general, linear and branched block copolymers which may be used in the present invention include those which may be represented by the general formula:

$$A_z\text{---}(B\text{---}A)_y\text{---}B_x$$

Wherein:
A is a linear or branched polymeric block comprising predominantly monoalkenyl aromatic hydrocarbon monomer units;
B is a linear or branched polymeric block containing predominantly conjugated diolefin monomer units;
x and z are, independently, a number equal to 0 to 1;
y is a whole number ranging from 0 to about 15, and the sum of $x+z+y \geq 2$.

Polymers which may be treated in accordance with this invention also include coupled and radial block copolymers such as those described in U.S. Pat. Nos. 4,033,888; 4,077,893; 4,141,847; 4,391,949 and 4,444,953, the disclosure of which patents are also incorporated herein by reference. Coupled and radial block copolymers which may be treated in accordance with the present invention include those which may be represented by the general formula:

$$[B_x\text{---}(A\text{---}B)_y\text{---}A_z]_n\text{---}C\text{---}P_{n'}$$

Wherein:
A, B x, y and z are as previously defined; n and n' are, independently, numbers from 1 to about 100 such that $n+n' \geq 3$;
C is the core of the coupled or radial polymer formed with a polyfunctional coupling agent; and
Each P is the same or a different polymer block or polymer segment having the general formula:

$$B'_{x'}\text{---}(A'\text{---}B'')_{y'}\text{---}A''_{z'}$$

Wherein:
A" is a polymer block containing predominantly monalkenyl aromatic hydrocarbon monomer units;
B' is a polymer block containing predominantly conjugated diolefin monomer units;
A'—B" is a polymer block containing monoalkenyl aromatic hydrocarbon monomer units (A') and conjugated diolefin monomer units (B"), the A'—B" monomer units may be random, tapered or block and when A'—B" is block, the A' block may be the same or different from A" and B" may be the same or different from B';
x' and z' are, independent, numbers equal to 0 or 1; and y' is a number from 0 to about 15, with the proviso that the sum of $x'+y'+z \geq 1$.

The radial polymers may, then, be symmetric or asymmetric.

In the production of all of the polymers described above, the polymerization is herein terminated by utilizing hydrogen gas in place of the conventionally used alcohol terminating agent. The living polymer, or more accurately, the living end of the polymer chain, is terminated by the addition of hydrogen thereto. The theoretical termination reaction is shown using an S—B—S block copolymer for exemplary purposes:

$$S—B—S^-Li^+ + H_2 \rightarrow S—B—SH + LiH$$

As shown above, it is theorized that lithium hydride is formed during the termination process. Formed in this manner, it is not a reactive polymerization initiator. It is inert to polymerization and does not interfere with the molecular weight control of the next polymerization batch as alcohol can.

It is usually adviseable to contact and vigorously mix the gas with the polymerization solution at the end of the polymerization reaction. This contact and vigorous mixing can be effected by adding the hydrogen gas through spargers in a mixing vessel containing polymer solution. The time of contact should be at least about ten seconds and preferably about twenty minutes to allow sufficient contact time for the reaction to occur. This is dependent upon the efficiency of the gas contacting equipment, gas solubility, solution viscosity and temperature. Alternatively, a continuous system could be employed whereby hydrogen is pumped into a solution prior to going to a statically mixed plug flow reactor. Hydrogen could also be dissolved in an appropriate solution and added to the polymer solution to be terminated. Another method would be to cause the hydrogen to be absorbed into an absorption bed and then cause the polymer solution to flow through the absorption bed. The hydrogen contact could also be carried out by adding a material which gives off hydrogen upon decomposition, i.e. diimide.

When hydrogen is used, the problems of using alcohol, i.e. the formation of lithium alkoxides and excess alcohol impurities, are avoided. Furthermore, this process has been found to have significant advantage if the polymer made is to be hydrogenated. It has been found that if the present method is used, a bis(cyclopentadienyl)titanium hydrogenation catalyst may be used without the necessity of a hydrocarbon lithium or alkoxy lithium promoter, whether added with the catalyst or present in the living polymer.

As stated above, the hydrogenation step of the present process is carried out in the presence of a bis(cyclopentadienyl)titanium compound of the formula:

$$(C_5H_5)_2Ti\begin{matrix} R_1 \\ R_2 \end{matrix}$$

wherein $R_1$ and $R_2$ are the same or different and are selected from the group consisting of halogen groups, $C_1-C_8$ alkyl and alkoxy groups, $C_6-C_8$ aryloxy groups, aralkyl, cycloalkyl groups, silyl groups and carbonyl groups. The hydrogenation step is carried out in the absence of hydrocarbon lithium and alkoxy lithium compounds.

Specific bis(cyclopentadienyl) compounds (these compounds are also sometimes referred to as titanocenes, i.e. titanocene dichloride) which may be used in the present invention include bis(cyclopentadienyl)titanium dichloride, bis(cyclopentadienyl)titanium dibromide, bis(cyclopentadienyl)titanium diiodide, bis(cyclopentadienyl)titanium difluoride, bis(cyclopentadienyl)titanium dicarbonyl, bis(cyclopentadienyl)titanium dimethyl, bis(cyclopentadienyl)titanium diethyl, bis(cyclopentadienyl)titanium dibutyl (including n-butyl, sec-butyl, tert-butyl), bis(cyclopentadienyl)titanium bis(trimethylsilylmethyl), bis(cyclopentadienyl)titanium dibenzyl, bis(cyclopentadienyl)titanium dihexyl, bis(cyclopentidienyl)titanium dimethoxide, bis(cyclopentadienyl)titanium diethoxide, bis(cyclopentadienyl)titanium dibutoxide, bis(cyclopentadienyl)titanium dipentoxide, bis(cyclopentadienyl)titanium dineopentoxide, bis(cyclopentadienyl) titanium diphenoxide, and all mixtures thereof. The preferred titanium compound is bis(cyclopentadienyl) titanium dichloride because of ease of handling, air stability and commercial availability.

This process will selectively hydrogenate conjugated diolefins without hydrogenating alkenyl aromatic hydrocarbons to any degree. Hydrogenation percentages of greater than 50% are easily obtained but it has been found that in order to achieve hydrogenation percentages of greater than 95% as is often desired, the alkali metal (for example, lithium) to titanium ratio must be at least about 2:1 and preferably is from about 3 to 30. There has to be sufficient alkali metal to ensure quick and sufficient interaction between the two metals. A high viscosity (high molecular weight) polymer may require a higher ratio because of the lesser mobility of the metals in the polymer cement. If alkali metal hydride must be added to increase the ratio, it can be made in situ by adding an organo alkali metal compound and hydrogen to the polymer (i.e., sparge), either before or after termination of the polymerization.

The above process is improved and the hydrogenation of the polymer is enhanced an alkyl benzoate, the alkyl portion preferably containing from 1 to 5 carbon atoms and most preferably ethyl benzoate or methyl benzoate as a promoter during the hydrogenation step. The alkyl benzoate may be added directly to the polymer solution prior to catalyst addition as a neat substance, but it is preferred that the alkyl benzoate be diluted in cyclohexane because of the low amounts of alkyl benzoate that are being added. The alkyl benzoate boosts the activity of the titanium catalyst and generally results in more extensive saturation of the diene segments of the polymer. Also, in many cases, the catalyst loading level may be reduced. This is advantageous because of cost factors and because there will be a lower amount of catalyst residue in the polymer. The advantages are illustrated by FIGS. 1 and 2 wherein olefin conversion improvements can be seen for both polybutadiene and polyisoprene based block copolymers.

In general, the hydrogenation is carried out in a suitable solvent at a temperature within the range of from about 0° to about 120° C., preferably about 60° to about 90° C., and at a hydrogen partial pressure within the range from about 1 psig to about 1200 psig, preferably from about 100 to about 200 psig. Catalyst concentrations within the range from about 0.01 mM (millimoles) per 100 grams of polymer to about 20 mM per 100 grams of polymer, preferably 0.04 to 1 mM catalyst per 100 grams of polymer, are generally used and contacting at hydrogenation conditions is generally continued for a period of time within the range from about 30 to about 360 minutes. It is preferred that the alkyl benzoate be used in a molar ratio of titanium to alkyl benzoate of from about 1:1 to about 6:1 because operating outside of this range of ratios results in a decrease in ultimate olefin conversion. Suitable solvents for hydrogenation include, among others, n-heptane, n-pentane, tetrahydrofuran, cyclohexane, toluene, hexane and benzene. Because of the small amount of catalyst present in the polymer after hydrogenation, it is not necessary to separate the hydrogenation catalyst and catalyst residue from the polymer. However, if separation is desired, it may be carried using methods well known in the prior art. Hydrogenation may be carried out in other manners such as batch processes, continuous processes, and semi-continuous processes.

EXAMPLE 1

A polystyrene-polybutadiene-polystyrene block copolymer of 50,000 molecular weight was prepared by anionic polymerization using sec-butyl lithium as the initiator. The polymerization took place in a mixture of cyclohexane and diethyl ether. The resulting polymer solution contained 20% polymer by weight. The polymerization was terminated by sparging the polymer solution with hydrogen gas for approximately 30 minutes. This generated the cocatalyst for the hydrogenation reaction, LiH. For all of the following examples of hydrogenation of polymers, this feedstock was used as is.

EXAMPLE 2

(Example 2 and 3 are Comparative Examples for Cases with and without Methyl Benzoate)

1560 grams of the polymer solution was pressure transferred to a 4-liter autoclave reactor. The amount of LiH present in the polymer solution was calculated to be 6.4 millimoles (mm). The polymer solution was stirred for at 630 rpms for approximately 30 minutes, during which time it was also heated to 90° C. At this time, 0.125 mm of bis(cyclopentadienyl)titanium dichloride suspended in 30 mls of cyclohexane, was added to the reactor. After catalyst addition, the reactor was pressurized to 400 psig hydrogen and the reactor temperature was maintained at 90° C. The hydrogenation reaction was allowed to proceed for three hours. The final conversion of the olefin was 74.0%, i.e. 74.0% of the aliphatic double bonds in the diene block were saturated.

EXAMPLE 3

1560 grams of 20% by weight polymer solution was pressure transferred to a 4-liter autoclave reactor. The amount of LiH present in the polymer solution was calculated to be 6.4 mm. To the polymer solution was added 0.75 mm of methyl benzoate. The solution was stirred at 630 rpms for approximately 30 minutes, during which time it was also heated to 90° C. At this time, 0.125 mm of bis(cyclopentadienyl)titanium dichloride, suspended in 30 mls of cyclohexane, was added to the reactor. After catalyst addition, the reactor was pressurized to 400 psig hydrogen and the reactor temperature was maintained at 90° C. The hydrogenation reactor was allowed to proceed for three hours. The final conversion of the olefin was 98.7%. Thus, the methyl benzoate promoted system achieved much higher conversion.

EXAMPLE 4

(Examples 4 and 5 are Comparative Examples for Cases with and without Methyl Benzoate)

1560 grams of a 20% by weight polymer solution was pressure transferred to a 4-liter autoclave reactor. The amount of LiH present in the polymer solution was calculated to be 6.4 mm. The polymer solution was stirred at 905 rpms for approximately 30 minutes, during which time it was also heated to 70° C. At this time, 0.25 mm bis(cyclopentadienyl)titanium dichloride, suspended in 30 mls of cyclohexane, was added to the reactor. After catalyst addition, the reactor was pressurized to 140 psig hydrogen and the reactor temperature was maintained at 70° C. The hydrogenation reaction was allowed to proceed for three hours. The final conversion of the olefin was 90.6%.

EXAMPLE 5

1560 grams of a 20% by weight polymer solution was pressure transferred to a 4-liter autoclave reactor. The amount of LiH present in the polymer solution was calculated to be 6.4 mm. To the polymer solution was added 0.58 mm methyl benzoate. The polymer solution was stirred at 905 rpms for approximately 30 minutes, during which time it was also heated to 70° C. At this time, 0.25 mm bis(cyclopentadienyl)titanium dichloride, suspended in 30 mls of cyclohexane, was added to the reactor. After catalyst addition, the reactor was pressurized to 140 psig hydrogen and the reactor temperature was maintained at 70° C. The hydrogenation reaction was allowed to proceed for three hours. The final conversion of the olefin was 98.7%. Again, the methyl benzoate promoted system achieved a higher conversion under the same conditions.

EXAMPLE 6

(Examples 6 and 7 are Comparative for Differing Levels of Methyl Benzoate Addition)

1560 grams of a 20% by weight polymer solution was pressure transferred to a 4-liter autoclave reactor. The amount of LiH present in the polymer solution was calculated to be 6.4 mm. To the polymer solution was added 0.50 mm methyl benzoate. The polymer solution was stirred at 850 rpms for approximately 30 minutes, during which time it was also heated to 75° C. At this time, 0.33 mm of bis(cyclopentadienyl)titanium dichloride, suspended in 30 mls of cyclohexane, was added to the reactor. After catalyst addition, the reactor was pressurized to 240 psig hydrogen and the reactor temperature was maintained at 70° C. The hydrogenation reaction was allowed to proceed for three hours. The final conversion of the olefin was 98.8%.

EXAMPLE 7

1560 grams of a 20% by weight polymer solution was pressure transferred to a 4-liter autoclave reactor. The amount of LiH present in the polymer solution was calculated to be 6.4 mm. To the polymer solution was added 0.75 mm methyl benzoate. The polymer solution was stirred at 850 rpms for approximately 30 minutes, during which time it was also heated to 75° C. At this time, 0.33 mm bis(cyclopentadienyl)titanium dichloride, suspended in 30 mls of cyclohexane, was added to the reactor. After catalyst addition, the reactor was pressurized to 240 psig hydrogen and the reactor temperature was maintained at 70° C. The hydrogenation reaction was allowed to proceed for three hours. The final conversion of the olefin was 99.3%. For this example, an increase in the amount of methyl benzoate appears to have resulted in increased conversion at the same conditions.

We claim:

1. In a process for the hydrogenation of conjugated diolefin polymers which comprises:
    (a) polymerizing or copolymerizing at least one conjugated diolefin with an organo-alkali metal polymerization initiator in a suitable solvent thereby creating a living polymer,
    (b) terminating the polymerization by the addition of $H_2$, and
    (c) selectively hydrogenating the unsaturated double bonds in the conjugated diolefin units of said terminated polymer by contacting the polymer, in the absence of hydrocarbon lithium and alkoxy lithium compounds, with hydrogen in the presence of at least one bis(cyclopentadienyl)titanium compound of the formula:

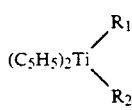

wherein $R_1$ and $R_2$ are the same or different and are selected from the group consisting of halogen groups, $C_1$-$C_8$ alkyl and alkoxy groups, $C_6$-$C_8$ aryloxy groups, aralkyl, cycloalkyl groups, silyl groups and carbonyl groups, the improvement which comprises using an alkyl benzoate as a promoter in step (c) to enhance the hydrogenation of the polymer.

2. The process of claim 1 wherein the hydrogenation is carried out at a temperature from about 0° C. to about 120° C. and a pressure of from about 1 psig to about 1200 psig and the catalyst concentration is from about 0.01 mM to about 20 mM of titanium per 100 g of polymer and the contacting takes place for a period of time within the range from about 15 to about 1440 minutes.

3. The process of claim 2 wherein the hydrogenation is carried out at a temperature from about 60°-90° C. and a pressure from about 100-200 psig, the catalyst concentration is from about 0.04-1.0 mM titanium per 100 g of polymer, the metal hydride to titanium molar ratio is from about 3-30 and the contacting takes place for a period of time from about 30 to 360 minutes.

4. The process of claim 1 wherein the alkali metal initiator is an organo lithium compound.

5. The process of claim 4 wherein the organo lithium compound is sec-butyllithium.

6. The process of claim 1 wherein the titanium compound is selected from the group consisting of bis(cyclopentadienyl)titanium dichloride, bis(cyclopentadienyl)titanium dibromide, bis(cyclopentadienyl)titanium diiodide, bis(cyclopentadienyl)titanium difluoride, bis(cyclopentadienyl)titanium dicarbonyl, bis(cyclopentadienyl)titanium dimethyl, bis(cyclopentadienyl)titaniumdiethyl, bis(cyclopentadienyl)titaniumdibutyl, bis(cyclopentadienyl)titanium bis(trimethylsilylmethyl), bis(cyclopentadienyl)titanium dibenzyl, bis(cyclopentadienyl)titanium dihexyl, bis(cyclopentadienyl)titanium dimethoxide, bis(cyclopentadienyl)titanium diethoxide, bis(cyclopentadienyl)titanium dibutoxide, bis(cyclopentadienyl)titanium dipentoxide, bis(cyclopentadienyl)titanium dineopentoxide, bis(cyclopentadienyl)titanium diphenoxide and all mixtures thereof.

7. The process of claim 6 wherein the titanium compound is bis(cyclopentadienyl)titanium dichloride.

8. The process of claim 6 wherein the alkali metal initiator is an organo lithium compound.

9. The process of claim 8 wherein the organo lithium compound is sec-butyllithium.

10. The process of claim 1 wherein a metal hydride is created in-situ by the termination of the living polymer.

11. The process of claim 10 wherein lithium hydride is created in-situ by termination of the living polymer.

12. The process of claim 1 wherein the alkali metal:titanium metal ratio during the hydrogenation is at least 2:1.

13. The process of claim 12 wherein alkali metal hydride is added to the polymer to be hydrogenated by adding an organo alkali metal compound and hydrogen to the polymer prior to addition of the hydrogenation catalyst.

14. The process of claim 13 wherein the metal hydride is created in-situ by the reaction of an organo alkali metal with hydrogen.

15. The process of claim 14 wherein lithium hydride is created in-situ by the reaction of a lithium alkali metal with hydrogen.

16. The process of claim 15 wherein lithium hydride is created in-situ by the reaction of sec-butyllithium with hydrogen.

17. The process of claim 1 wherein the alkyl portion of the alkyl benzoate contains from 1 to 5 carbon atoms.

18. The process of claim 17 wherein the alkyl benzoate is methyl benzoate or ethyl benzoate.

19. The process of claim 1 wherein the molar ratio of titanium to alkyl benzoate is from about 1:1 to about 6:1.

20. The process of claim 1 wherein at least 95% of the unsaturated bonds in the conjugated diene units are hydrogenated.

* * * * *